US011250967B2

(12) United States Patent
Heibel

(10) Patent No.: US 11,250,967 B2
(45) Date of Patent: Feb. 15, 2022

(54) METHOD AND APPARATUS FOR ENHANCING THE ELECTRICAL POWER OUTPUT OF A NUCLEAR REACTOR POWER GENERATION SYSTEM

(71) Applicant: Westinghouse Electric Company LLC, Cranberry Township, PA (US)

(72) Inventor: Michael D. Heibel, Harrison City, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 475 days.

(21) Appl. No.: 16/008,202

(22) Filed: Jun. 14, 2018

(65) Prior Publication Data
US 2019/0385757 A1    Dec. 19, 2019

(51) Int. Cl.
*G21H 1/04* (2006.01)
*G21C 3/40* (2006.01)
(Continued)

(52) U.S. Cl.
CPC .............. *G21H 1/04* (2013.01); *G21C 3/40* (2013.01); *G21F 1/08* (2013.01); *G21C 11/022* (2013.01); *G21C 19/07* (2013.01)

(58) Field of Classification Search
CPC ... G21C 1/00; G21C 1/02; G21C 1/04; G21C 3/40
See application file for complete search history.

(56) References Cited

U.S. PATENT DOCUMENTS 3,250,925 A * 5/1966 Salcedo Gumucio ... G21H 1/00
310/301
3,547,778 A * 12/1970 Ott .......................... G21D 7/04
376/321
(Continued)

FOREIGN PATENT DOCUMENTS

| EP | 3097567 B1 | 4/2018 |
|---|---|---|
| JP | 2017501397 A | 1/2017 |
| WO | 2020046428 A2 | 3/2020 |

OTHER PUBLICATIONS

International Search Report and Written Opinion for International PCT Application No. PCT/US2019/028439, dated Mar. 24, 2020.
(Continued)

*Primary Examiner* — Lily C Garner
(74) *Attorney, Agent, or Firm* — K&L Gates LLP

(57) ABSTRACT

A panel that uses the gamma radiation emitted by fission to produce electrical power. The panel includes layers of a metal with a relatively high atomic number (Z), that form an emitter, a high temperature electrical resistor, and an electrical conductor with a relatively low Z value, that forms a collector. The gamma radiation emitted during the fission process produces Compton and photoelectrical electrons in the layer of the Emitter located between the reactor Baffle and the fuel assemblies. The electrons that have sufficient energy to penetrate the resistor layer between the emitter layer and the collector layer will be stopped in the collector. This creates a substantial voltage difference between the emitter and the collector. This voltage difference may be used to produce significant electric power both during reactor operations and with the reactor shutdown to meaningfully augment the electricity produced by the turbine generators.

12 Claims, 2 Drawing Sheets

(51) Int. Cl.
*G21F 1/08* (2006.01)
*G21C 19/07* (2006.01)
*G21C 11/02* (2006.01)

(56) References Cited

U.S. PATENT DOCUMENTS

| | | | | |
|---|---|---|---|---|
| 3,678,920 | A * | 7/1972 | Cohen | G21H 1/00 |
| | | | | 126/344 |
| 5,672,928 | A | 9/1997 | Terhune | |
| 5,861,701 | A * | 1/1999 | Young | G21H 1/04 |
| | | | | 310/305 |
| 8,860,553 | B2 * | 10/2014 | Lal | H03B 5/326 |
| | | | | 340/10.1 |
| 9,640,290 | B2 * | 5/2017 | Heibel | G21C 9/00 |
| 10,109,380 | B2 * | 10/2018 | Heibel | H01J 47/1233 |
| 10,438,708 | B2 * | 10/2019 | Heibel | G21C 17/102 |
| 2013/0083879 | A1 | 4/2013 | Heibel et al. | |
| 2016/0148712 | A1 * | 5/2016 | Sandquist | G21G 1/06 |
| | | | | 376/158 |
| 2018/0308601 | A1 * | 10/2018 | Diggins | H01L 31/035281 |
| 2019/0392961 | A1 * | 12/2019 | Choi | G21G 1/12 |

OTHER PUBLICATIONS

International Preliminary Report on Patentability for International PCT Application No. PCT/US2019/028439, dated Dec. 15, 2020.

\* cited by examiner

METHOD AND APPARATUS FOR ENHANCING THE ELECTRICAL POWER OUTPUT OF A NUCLEAR REACTOR POWER GENERATION SYSTEM

BACKGROUND

1. Field

This invention pertains in general to nuclear powered electrical generation systems and, more particularly, to such systems that use the heat generated in the nuclear reactor to drive a turbine generator.

2. Related Art

Current nuclear powered electrical generation systems convert the heat generated in a nuclear reactor to steam which is used to drive turbine generators for the production of electricity in the form of alternating current. The alternating electric current is transmitted to an electrical distribution network and used to provide electrical power to consumers and industries. Using this process, the currently, most widely used nuclear technology, i.e., Light Water Reactors, can convert only about 30% of the total energy released by fission into usable electrical power. The reason for such a low efficiency stems from thermodynamic efficiency limitations imposed by the energy conversion path inherent in current reactor designs, i.e., thermal energy to mechanical energy, and by energy losses during the thermodynamic and mechanical energy conversions characterizing such a path. This low efficiency has a detrimental effect on the cost of the electrical power generated by existing nuclear power plants.

It is an object of this invention to overcome some of those inefficiencies by using the byproducts of the fission process to directly increase the amount of electricity such systems can produce, through direct, auxiliary conversion processes.

SUMMARY

These and other objects are achieved, in accordance with this invention, by an electron generating panel having an outer sheathing of a low Z metal; an electron generator comprising a high Z metal disposed within the sheathing and forming an emitter with a positive output pin extending through and electrically insulated from the sheathing; an electron charge collector comprising a low Z metal, disposed between the emitter and the sheathing, with a negative output pin extending through the sheathing, spaced and electrically insulated from the positive output pin and the sheathing; and a layer of insulation material occupying spaces between the sheathing, the emitter and the collector. In one embodiment, the high Z metal comprises Lead or Tungsten and the low Z metal comprises Inconel or a Steel alloy. The layer of insulation may comprise aluminum-oxide or B-10 and, desirably, is approximately 1 mm thick.

In an application to a nuclear reactor, the electron generating panel may be positioned between an outer perimeter of a nuclear reactor core and a surrounding structural member such as the baffle-former plate structure that surrounds the core, wherein the electron generating panel is fastened to a baffle plate with the screws that attach the baffle plates to the former plates. Preferably, the electron generating panel is approximately 3 mm thick and the screws that attach the electron generating panel to the baffle plates are electrically insulated from the electron generating panel.

In another embodiment, the electron generating panel includes a layer of Co-59 between the sheathing and the emitter on a side of the emitter opposite that of the collector with the insulation positioned between the sheathing and the Co-59 and the Co-59 and the emitter, to enhance the electrical output when the reactor is shut down.

In still another embodiment wherein the electron generating panel is being irradiated with gamma radiation on both sides of the panel, the collector may span the opposite sides of the emitter with the sides of the collector on opposite sides of the emitter in electrical communication with each other. In such an embodiment the collector may be a cylinder that surrounds the emitter. The electron generating panel may be supported on a wall of a fuel assembly cell of a modular fuel rack in a reactor core, in a spent fuel pool or in a spent fuel storage cask.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

In one embodiment of this invention the design of a nuclear power reactor system is enhanced by incorporating an additional energy conversion path, not relying exclusively on fission heat, which captures more of the energy released by the fission process. The approach taken by this invention will allow a significant increase in the electrical generation provided by a nuclear power plant and a corresponding reduction in the net cost of the electricity produced.

Figure 1:
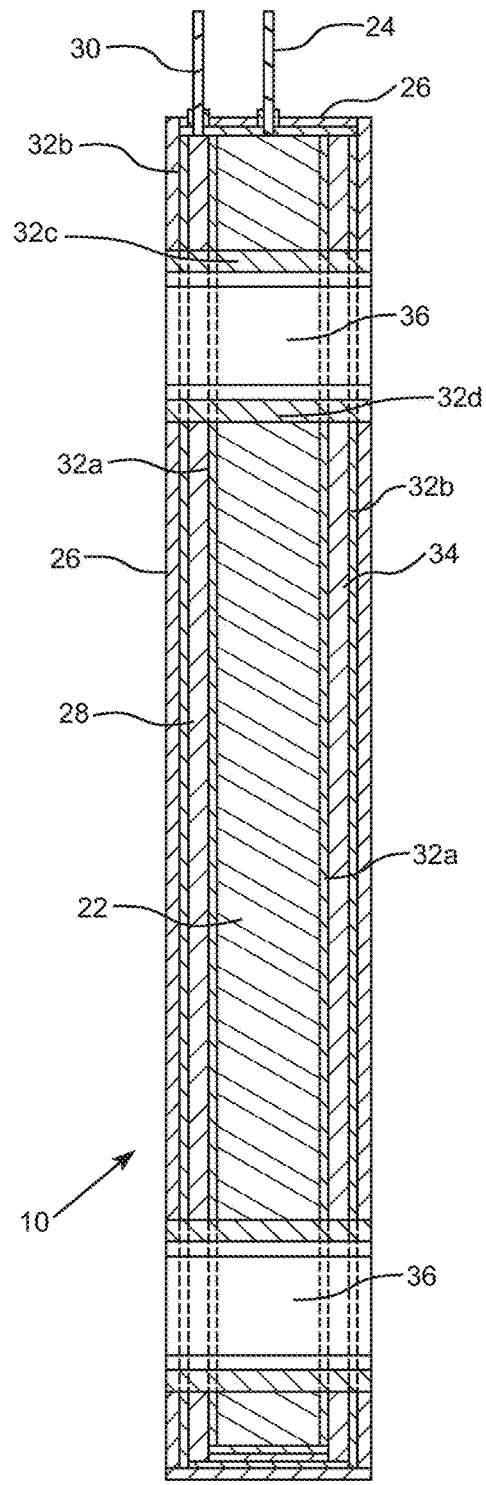
FIG. 1 is a schematic view, with portions shown in cross-section of one embodiment of this invention.

In one such embodiment applied to a nuclear reactor electrical power generating system the apparatus used to convert fission gamma energy from the fuel pellets in a fuel rod to an electrical potential that can be used to produce electric power is illustrated in FIG. 1. FIG. 1 shows a cross-section of a preferred embodiment of a radiation energy harvesting device, also referred herein as an electron generating panel (10), contemplated by this invention. In the embodiment shown in FIG. 1, the Gamma Harvesting Panel (10) includes a central emitter (22) formed from a high atomic number (Z) material, such as Lead or Tungsten, with the emitter (22) surrounded by a first layer of high temperature electrical insulation (32a), such as aluminum-oxide or B-10. The emitter (22) has a positive output pin (24) that extends through and is electrically insulated from an outer sheath (26) that surrounds the entire Gamma Harvesting Panel (10) and forms an outer housing. Preferably, the sheath (26) is formed from a low Z metal. A charge collector (28), also formed from such a low Z material, such as Inconel or Steel alloy, is positioned within the sheathing (26) on a side of the emitter (22) facing away from the reactor core and a negative output pin (30) extends from the collector (28) through and is electrically insulated from the outer sheath (26). The collector (28) is also surrounded by a second layer of high temperature insulation (32b).

The gamma radiation emitted during the fission process, and from the resulting unstable fission byproducts, produces Compton and photoelectrical electrons in the thin (~0.1 mm) layer of the Emitter located on the outside of the reactor baffle plates (14, shown in FIG. 2), or around the faces of the fuel assemblies (not shown). The electrons that have sufficient energy to penetrate the thin (~0.1 mm) cylindrical layer of aluminum-oxide insulation (32a) that surround the emitter layer (22) will be stopped in the collector (28) that is faced adjacent to the insulation layer (32a). This creates a substantial voltage difference between the emitter layer and the collector layer. This invention contemplates how this voltage difference may be used to produce significant electric power both during reactor operation and with the reactor shutdown. This concept will also be effective if applied to plate-style nuclear fuel assemblies, due to the increase in the surface to volume ratio of the fuel. The higher fuel enrichments used in a plate-style fuel assembly will also significantly enhance the relative amount of electric power that may be generated using this approach.

Figure 2:
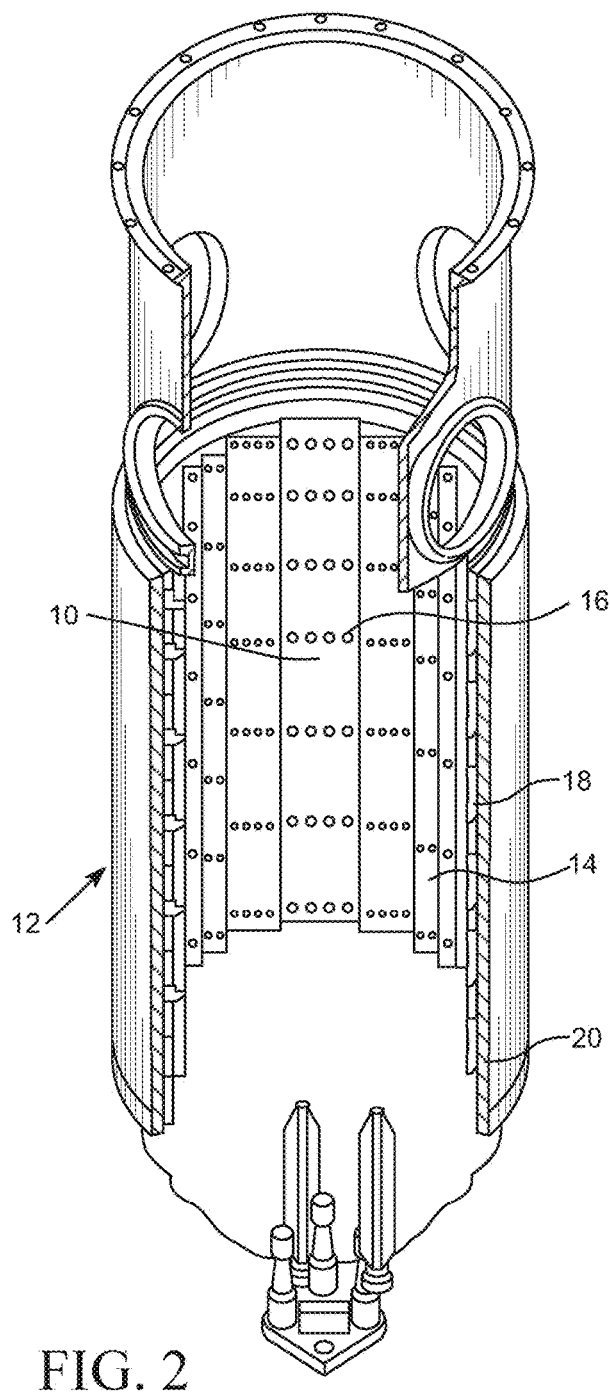
FIG. 2 is a schematic view of a reactor vessel and core barrel with portions cut away to better show the core barrel and baffle-former arrangement.

FIG. 2 shows a cutaway of a reactor vessel (12) with a Gamma Harvesting Panel (10) bolted to a reactor vessel baffle (14) using the bolt penetrations (16) that connect the baffle (14) to the former hardware (18). The baffle-former hardware is used to transition from the inner circular surface of the core barrel (20) to the stepped perimeter of the peripheral fuel assemblies (not shown) in the core. This approach would allow simple removal of the Gamma Harvesting Panels (10) during baffle (14) inspections or reactor decommissioning. The Gamma Harvesting Panels (10) are attached to the baffle plates (14) using two insulated bolt penetration metal cylinders (36) constructed from the same material as the baffle bolts 14, such as stainless steel, and spaced along the Gamma Harvesting Panel. The cylinders (36) function as attachment sleeves that have a first layer of insulation (32c) and a second layer of insulation (32d), such as Aluminum Oxide, interposed between the sleeve and the Gamma Harvesting Panel.

Essentially all of the gamma radiation from fission events and from unstable fission products exits the fuel pellet volume. Most of the gamma radiation will ionize the atoms in the Gamma Harvesting Panel that surround the reactor through Compton or photoelectrical interactions. The Compton and photoelectrical interactions will produce large numbers of electrons with kinetic energy high enough to penetrate the insulating material positioned between the Gamma Harvesting Panel emitter (22) and collector (28). The net result of this process is that the collector material has a large net negative charge and the emitter material has a large net positive charge. This produces a large voltage difference that may be used to produce an electric current that can be used to generate a useful amount of electric power. Measured performance data from Tungsten self-powered detector elements demonstrate that hundreds of kilowatts to megawatts of electric power can be generated.

In another embodiment, a thin layer of Co-59 (34) can be placed on the reactor side of the emitter layer (22) to increase the power available when the reactor is shut down. The Co-59 will be converted to Co-60 when the reactor is operating at high power. The gamma radiation emitted by Co-60 decay will supplement the fission product gamma radiation emitted when the reactor is shut down. The Co-60 gamma radiation would then become a source of gamma radiation that produces useable electric power even when the reactor is shut down.

Figure 3:
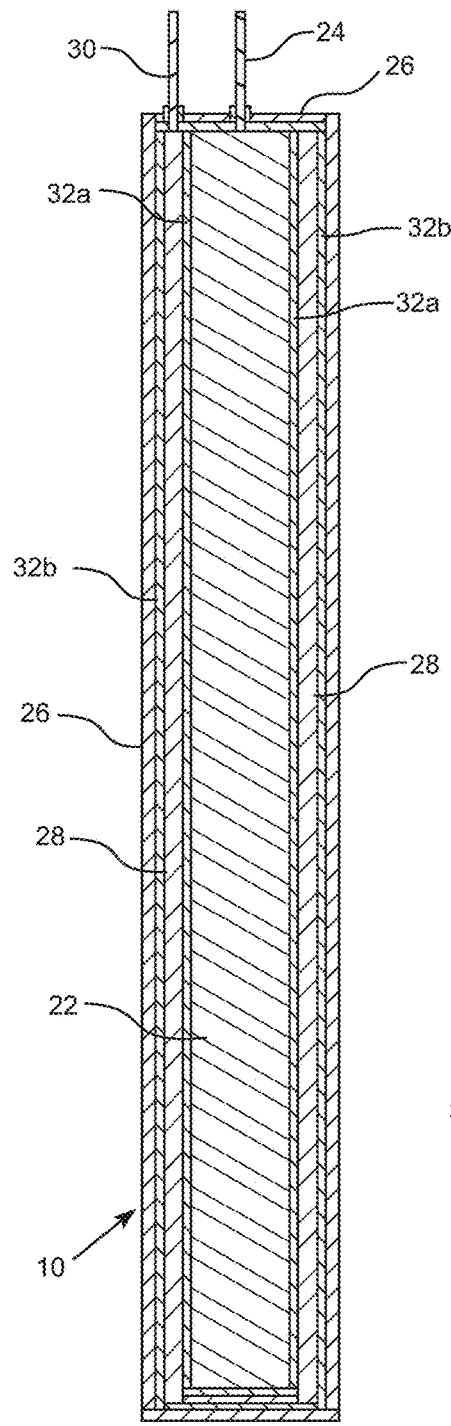
FIG. 3 is a schematic cross-sectional view of another embodiment of this invention.

FIG. 3 provides a schematic representation of a dual-sided Gamma Harvesting Panel device that is optimized to harvest gamma radiation energy from either side of the Gamma Harvesting Panel (10). The primary difference between the FIG. 1 and FIG. 3 design is the addition of collector configurations (28) on either face of the Gamma Harvesting Panel. The two collectors (28) are in electrical communication with each other and with the negative output pin 30 and are separated from both the emitter (22) by the first layer of insulation (32a) and the outer sheath (26) by the second layer of the electrical insulation (32b). This double cathode configuration will better suit a device subject to gamma radiation from all directions.

Figure 4:
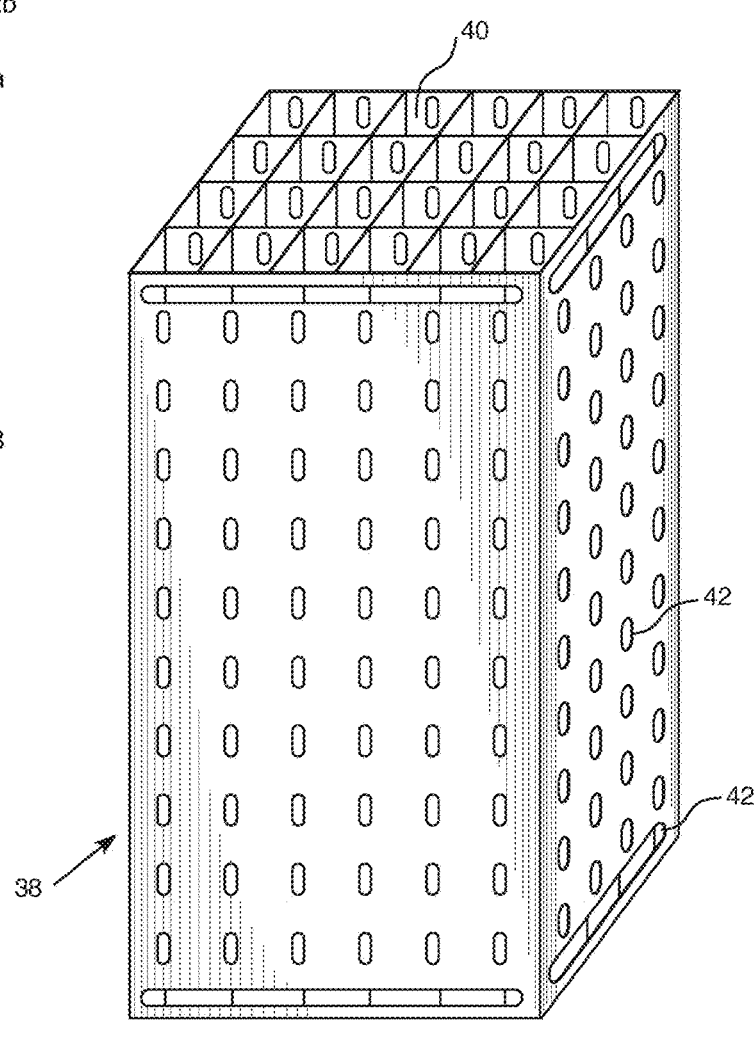
FIG. 4 is a perspective view of a modular fuel assembly storage cell rack section using the double sided Gamma Harvesting Panels embodiment of this invention as the cell wall inserts.

FIG. 4 shows a lattice layout of a modular fuel assembly storage device section (38) for surrounding and containing either fuel in the reactor core, fuel assemblies in the spent fuel pool, or fuel assemblies placed in dry fuel storage. The walls of the lattice cells (40) in the device (38) are constructed of the dual-sided Gamma Harvesting Panel style shown on FIG. 3 and flow vents (42) are provided in the walls (40) of each of the cells to facilitate coolant flow. Each of the cells is sized to accept a fuel assembly. Significant useful electric power can be obtained in any of these applications. For spent fuel pool and dry storage cask applications, high density Boron may be used to replace the outer Aluminum-Oxide layer for neutron reactivity control. This configuration could also be made integral to the "can" surrounding boiling water reactor fuel pins in a boiling water reactor fuel assembly.

Calculations were run for using this invention on the baffle plates of a four loop pressurized water reactor with the electron generating panels supported on the baffle plates opposite forty-four, face-adjacent, 17×17 fuel assemblies with active fuel 144 inches (3657.6 mm) long. The results show that the additional power added to the output of the reactor is approximately 50 MWe.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An electron generating panel comprising:
   an outer sheathing of a low Z metal which forms an outer housing around the electron generating panel;
   an electron generator comprising a high Z metal disposed within the sheathing and forming an emitter with a positive output pin extending through the sheathing, electrically insulated from the sheathing;
   an electron charge collector comprising a low Z metal disposed between the emitter and the sheathing on a side of the emitter, with a negative output pin extending through the sheathing and the collector, electrically insulated from the sheathing and, spaced and electrically insulated from the positive output pin;
   a first layer of insulation material occupying spaces between the emitter and the collector; and
   a second layer of insulation material occupying spaces between the sheathing and the collector.

2. The electron generating panel of claim 1 wherein the high Z metal comprises Lead or Tungsten.

3. The electron generating panel of claim 1 wherein the low Z metal comprises Inconel or Steel alloy.

4. The electron generating panel of claim 1 wherein the layer of insulation comprises aluminum oxide or boron-10.

5. The electron generating panel of claim 1 wherein the layer of insulation surrounding the emitter is a cylinder approximately 1 mm thick.

6. The electron generating panel of claim 1 wherein the electron generating panel is positioned between an outer perimeter of a nuclear reactor core comprising a plurality of fuel assemblies and a structural member surrounding the plurality of fuel assemblies.

7. The electron generating panel of claim 6 wherein the structural member is a baffle-former plate structure, wherein a baffle-former plate structure comprises a baffle plate attached to a former plate and the electron generating panel is fastened to the baffle plate of the baffle-former plate structure surrounding the core.

8. The electron generating panel of claim 1 wherein the electron generating panel is approximately 3 mm thick.

9. The electron generating panel of claim 1 further comprising a layer of cobalt-59 between the sheathing and the emitter on a side of the emitter opposite that of the collector with the first layer of insulation material extending around the emitter to between the cobalt-59 and the emitter and the second layer of insulation material extending around the collector and the cobalt-59 to between the sheathing and the cobalt-59.

10. The electron generating panel of claim 1 wherein the collector spans opposite sides of the emitter with the sides of the collector on opposite sides of the emitter in electrical communication with each other.

11. The electron generating panel of claim 10 wherein the collector is a cylinder that surrounds the emitter.

12. The electron generating panel of claim 10 is supported on a wall of a fuel assembly cell of a modular fuel rack.

* * * * *